(12) United States Patent
Hall

(10) Patent No.: US 9,777,886 B2
(45) Date of Patent: Oct. 3, 2017

(54) WINCH MOUNTING KIT

(71) Applicant: Ronald Hall, Central Square, NY (US)

(72) Inventor: Ronald Hall, Central Square, NY (US)

( * ) Notice: Subject to any disclaimer, the term of this patent is extended or adjusted under 35 U.S.C. 154(b) by 221 days.

(21) Appl. No.: 14/706,725

(22) Filed: May 7, 2015

(65) Prior Publication Data
US 2016/0327205 A1 Nov. 10, 2016

(51) Int. Cl.
*F16M 13/02* (2006.01)
*B66D 1/28* (2006.01)
*A22B 5/06* (2006.01)
*B60P 1/54* (2006.01)
*B66D 1/04* (2006.01)

(52) U.S. Cl.
CPC ............. *F16M 13/022* (2013.01); *A22B 5/06* (2013.01); *B60P 1/5471* (2013.01); *B66D 1/04* (2013.01); *B66D 1/28* (2013.01); *F16M 13/02* (2013.01)

(58) Field of Classification Search
CPC ........ F16M 13/022; A22B 5/06; A22B 5/161; B60P 1/54; B60P 1/5471; B66C 23/44; B66D 1/04; B66D 1/28
USPC ........... 248/558; 414/462; 452/192; 212/180
See application file for complete search history.

(56) References Cited

U.S. PATENT DOCUMENTS

| | | | | |
|---|---|---|---|---|
| 5,713,626 A | * | 2/1998 | Tokarski | B25H 1/0021 297/171 |
| 5,791,858 A | * | 8/1998 | Sasser | A22B 5/161 414/462 |
| 5,820,455 A | | 10/1998 | Breedlove | |
| 6,062,974 A | * | 5/2000 | Williams | A22B 5/06 452/187 |
| 6,250,483 B1 | * | 6/2001 | Frommer | A22B 5/06 212/180 |
| 6,695,688 B1 | | 2/2004 | Owen et al. | |
| 6,739,964 B2 | | 5/2004 | Gearhart | |
| 7,059,955 B2 | | 6/2006 | Green et al. | |
| 7,341,507 B1 | * | 3/2008 | Julian, Sr. | A22B 5/06 452/192 |
| 7,476,149 B2 | * | 1/2009 | Burrows | A22B 5/06 452/187 |
| D625,386 S | | 10/2010 | Missildine | |
| 7,913,980 B1 | | 3/2011 | Cipriano | |
| 8,302,922 B1 | * | 11/2012 | Robinson | A47G 25/08 211/107 |
| 2007/0089932 A1 | * | 4/2007 | Boyett | A01M 31/02 182/133 |

* cited by examiner

*Primary Examiner* — Anita M King

(57) ABSTRACT

A winch mounting kit includes a first mount that may be removably coupled to a stanchion. The first mount may have a winch is removably attached thereto such that the winch is secured on the stanchion. A second mount is provided that may be removably coupled to a horizontal support. The second mount may have the winch being removably attached thereto such that the winch is secured on the horizontal support. A third mount is provided that may be removably coupled to a vertical support. The third mount may have the winch being removably attached thereto such that the winch is secured to the vertical support.

13 Claims, 5 Drawing Sheets

WINCH MOUNTING KIT

BACKGROUND OF THE DISCLOSURE

Field of the Disclosure

The disclosure relates to winch devices and more particularly pertains to a new winch device for facilitating a winch to be coupled to a variety of supports.

SUMMARY OF THE DISCLOSURE

An embodiment of the disclosure meets the needs presented above by generally comprising a first mount that may be removably coupled to a stanchion. The first mount may have a winch is removably attached thereto such that the winch is secured on the stanchion. A second mount is provided that may be removably coupled to a horizontal support. The second mount may have the winch being removably attached thereto such that the winch is secured on the horizontal support. A third mount is provided that may be removably coupled to a vertical support. The third mount may have the winch being removably attached thereto such that the winch is secured to the vertical support.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
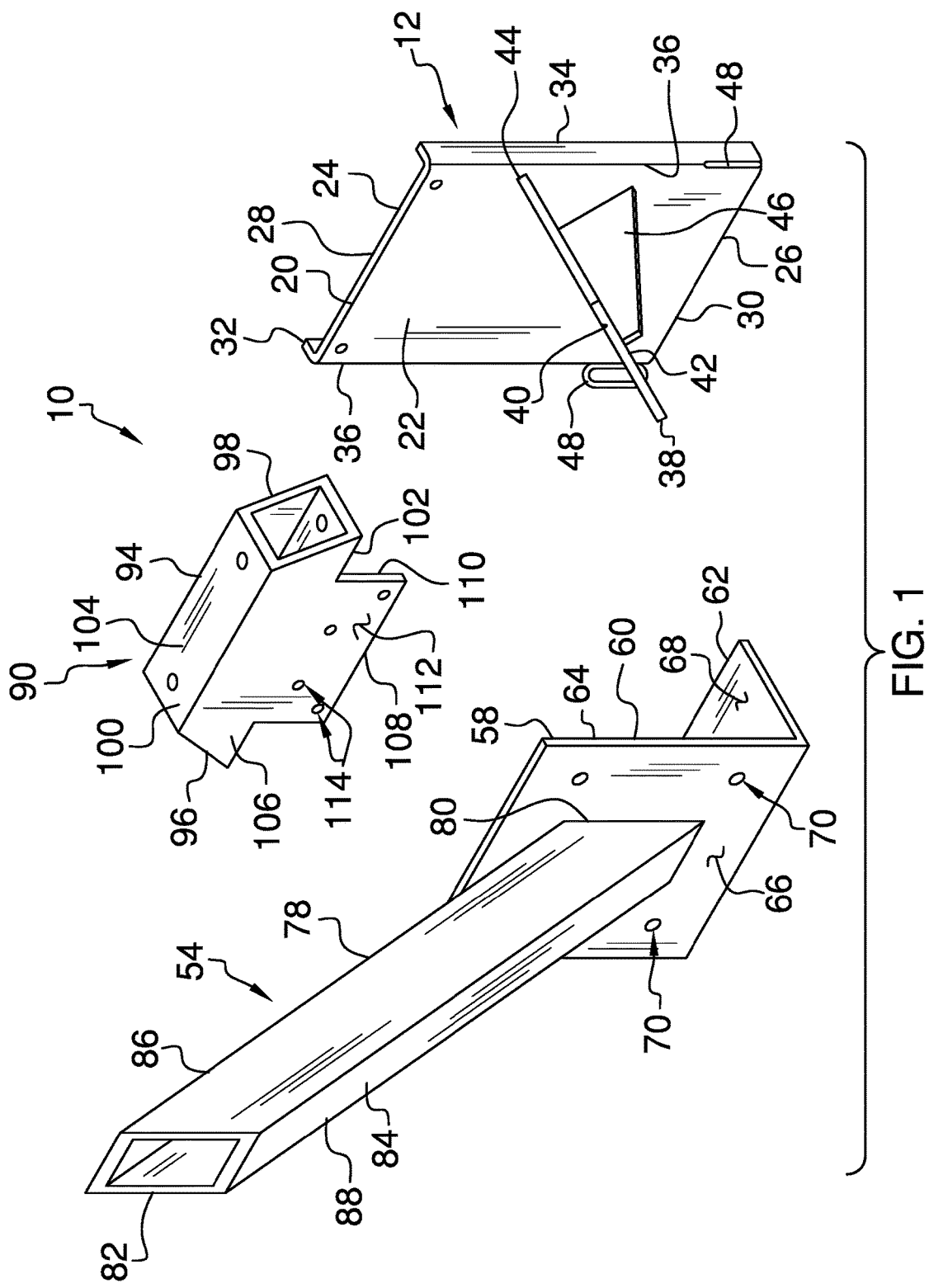
FIG. 1 is a kit view of a winch mounting kit according to an embodiment of the disclosure.
Figure 2:
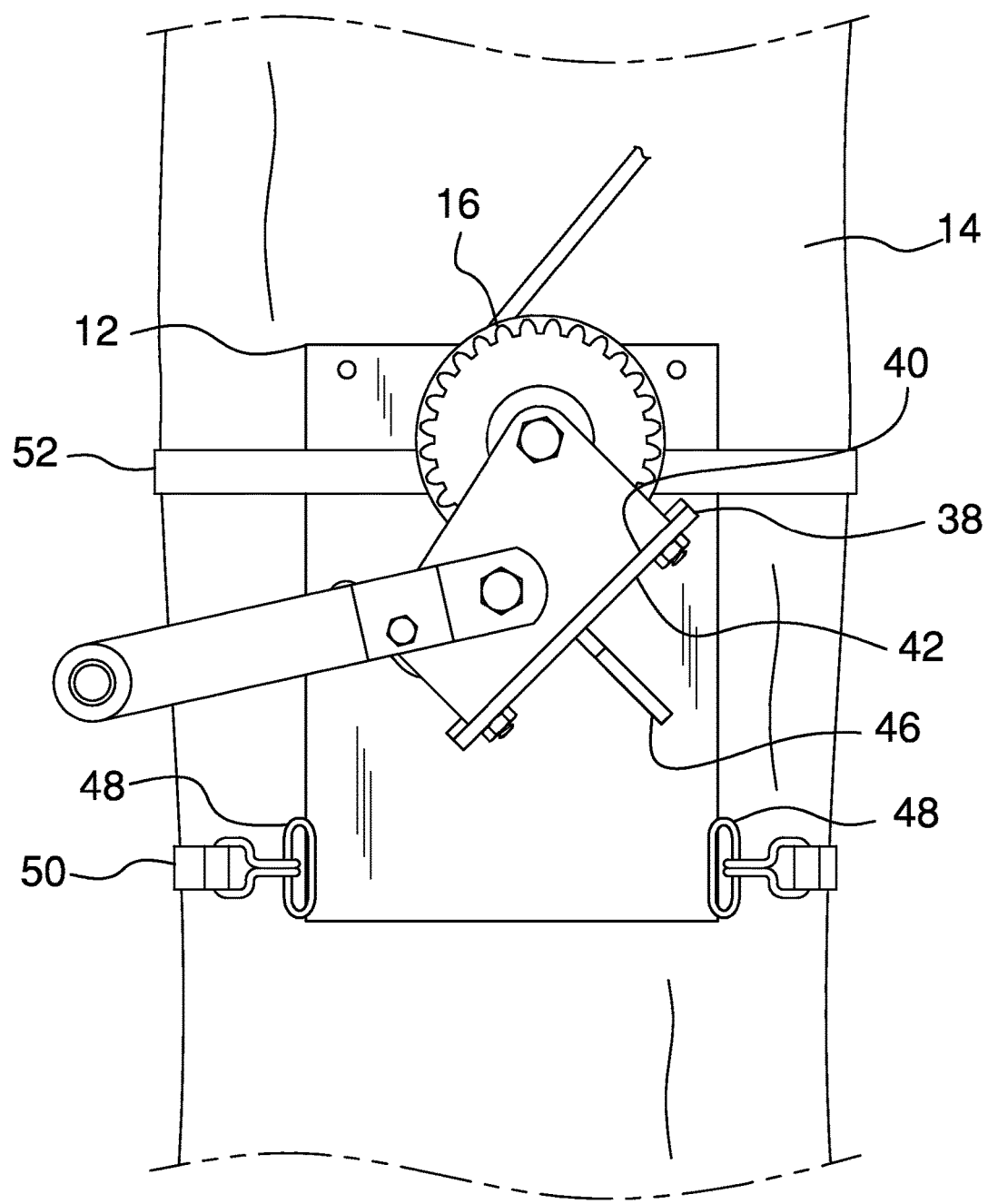
FIG. 2 is a front perspective in-use view of a first mount of an embodiment of the disclosure.
Figure 3:
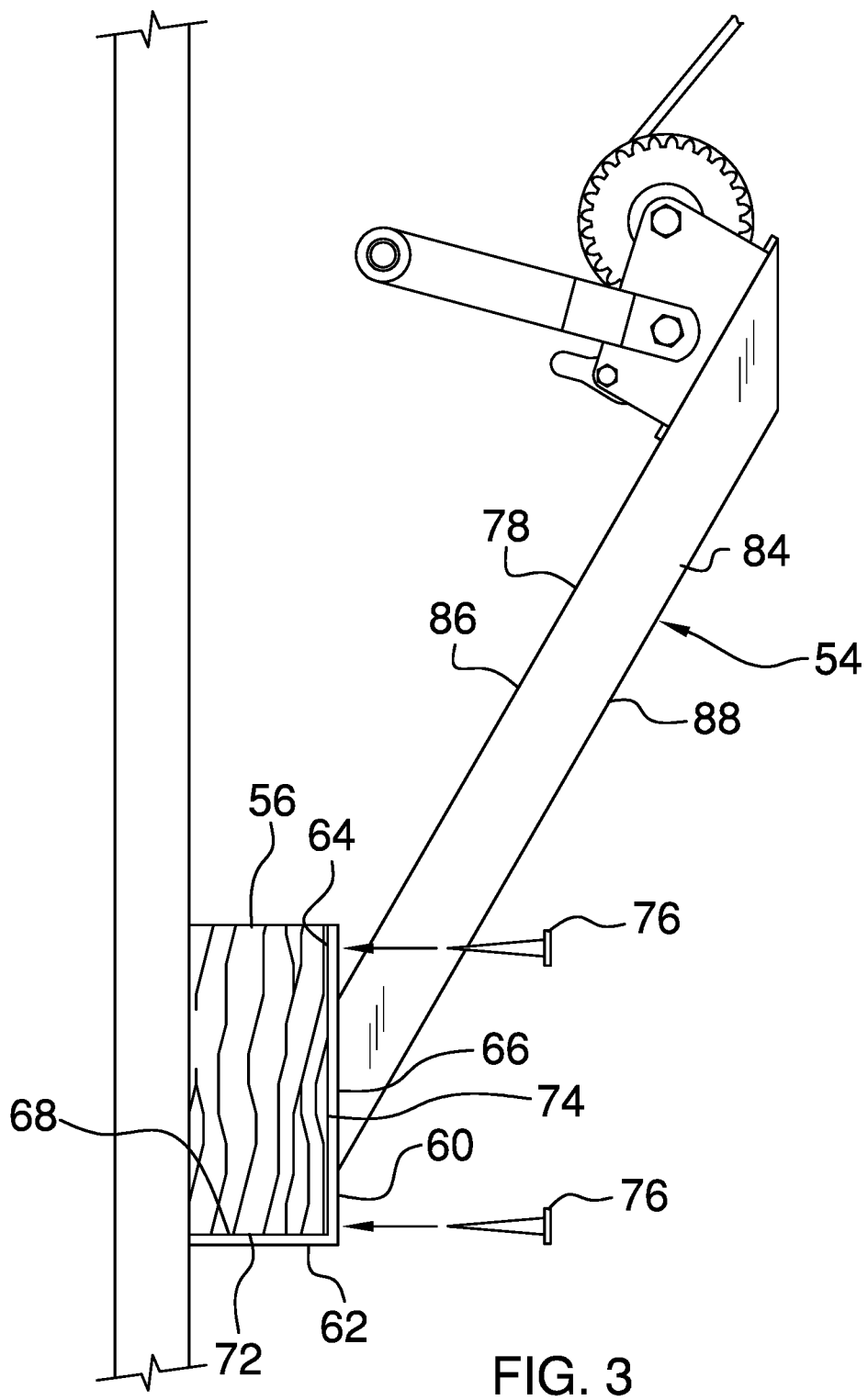
FIG. 3 is a right side in-use view of a second mount of an embodiment of the disclosure.
Figure 4:
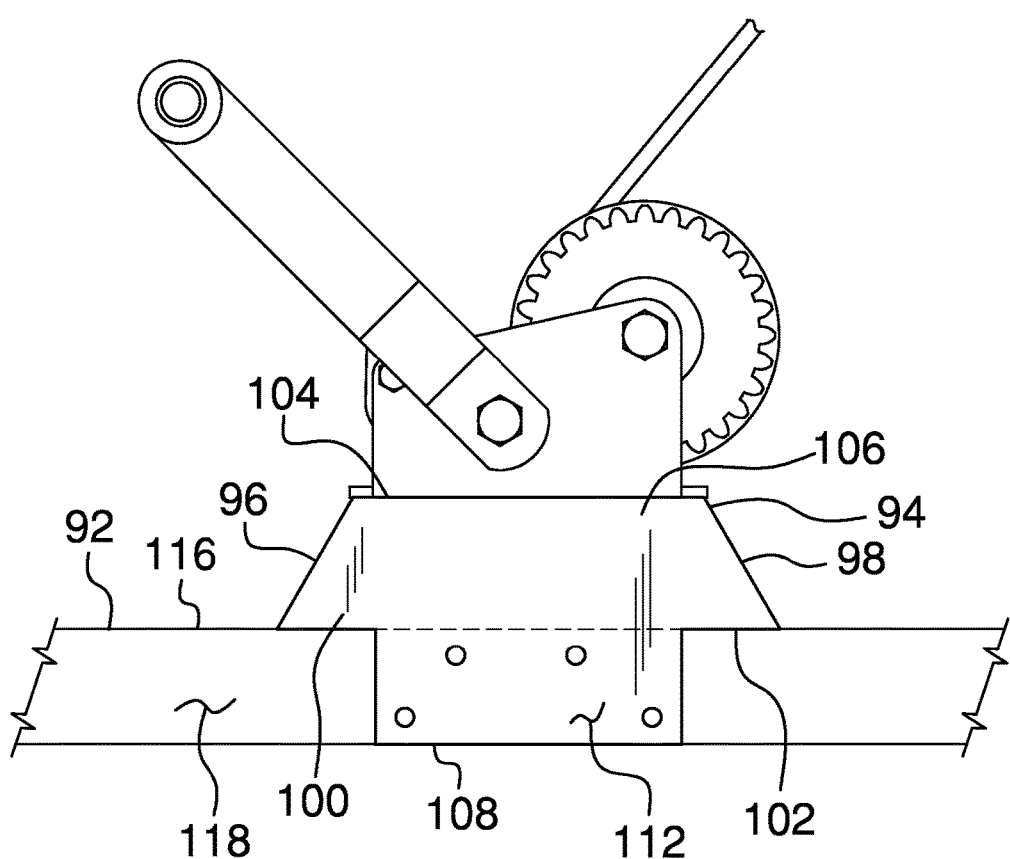
FIG. 4 is a perspective in-use view of a third mount of an embodiment of the disclosure.
Figure 5:
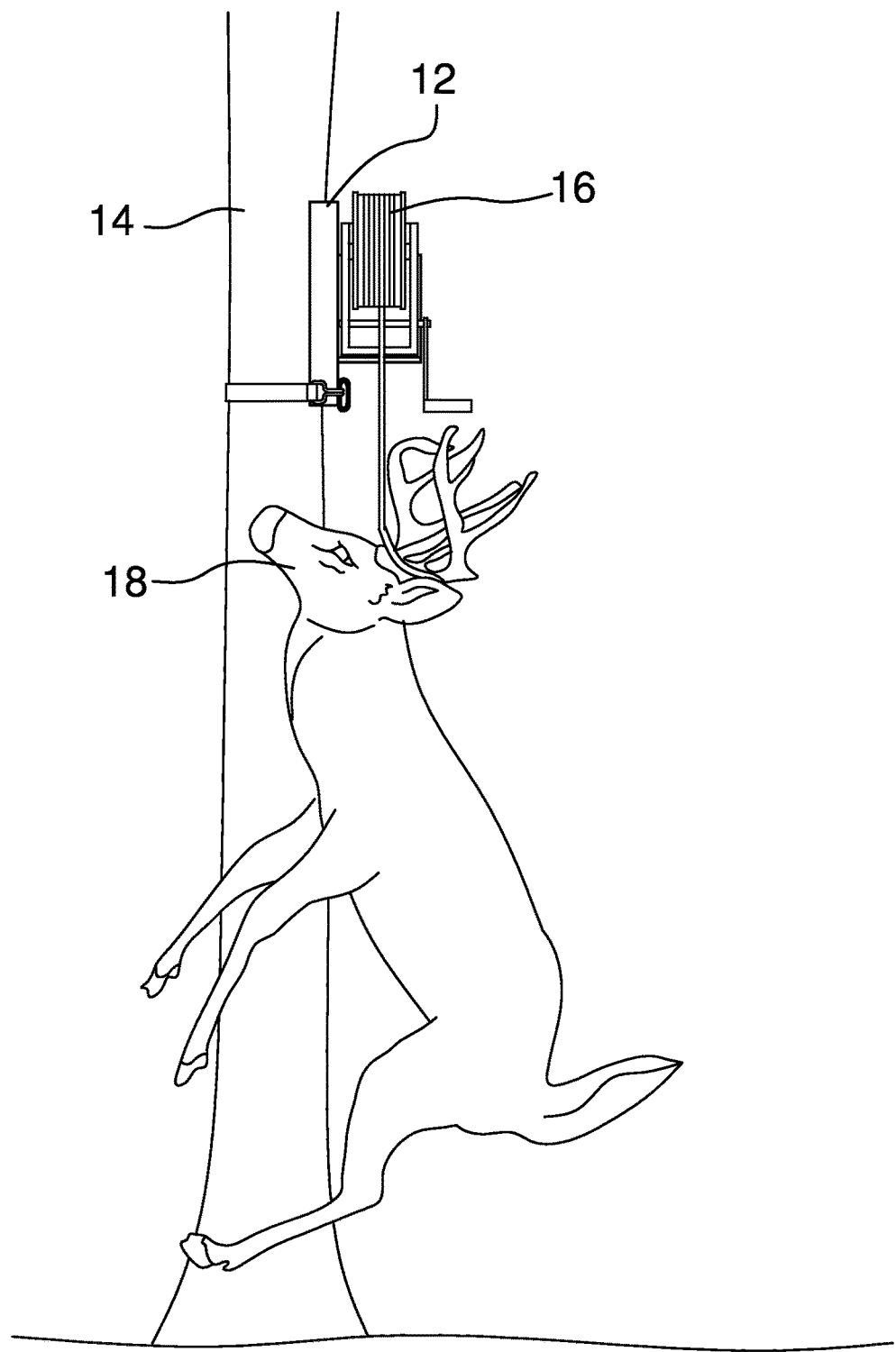
FIG. 5 is a left side perspective in-use view of an embodiment of the disclosure.

With reference now to the drawings, and in particular to FIGS. 1 through 5 thereof, a new winch device embodying the principles and concepts of an embodiment of the disclosure and generally designated by the reference numeral 10 will be described.

As best illustrated in FIGS. 1 through 5, the winch mounting kit 10 generally comprises a first mount 12 that may be removably coupled to a stanchion 14. The first mount 12 may have a winch 16 removably attached thereto such that the winch 16 is secured on the stanchion 14. The winch 16 may be a hand operated winch or the like and the winch 16 may be used to hoist game 18 for dressing purposes after the game 18 has been killed. The game 18 may be a large animal such as a white tailed deer, a mule deer or other large animal typically hunted for meat.

The first mount 12 comprises a plate 20 that has a front side 22, a back side 24 and a peripheral edge 26 extending between the front side 22 and the back side 24. The peripheral edge 26 has a top side 28, a bottom side 30, a first lateral side 32 and a second lateral side 34. The plate 20 has a pair of bends 36 thereon and each of the bends 36 is positioned adjacent to and is coextensive with an associated one of the first lateral side 32 and the second lateral side 34. Thus, each of the first lateral side 32 and the second lateral side 34 are directed rearwardly from the back side 24. The plate 20 may be positioned on the stanchion 14 having each of the first lateral side 32 and the second lateral side 34 abutting the stanchion 14. The stanchion 14 may be a tree or the like.

The first mount 12 includes a support 38 that has a top surface 40, a bottom surface 42 and a rear edge 44 and the rear edge 44 is coupled to the front side 22 of the plate 20. The support 38 is positioned at an angle such that the support 38 extends substantially between an intersection of the first lateral side 32 and the bottom side 30 and an intersection of the second lateral side 34 and the top side 28. The top surface 40 may have the winch 16 coupled thereto. A gusset 46 is coupled between the bottom surface 42 of the support 38 and the front side 22 of the plate 20 wherein the gusset 46 supports a weight of the winch 16 and the game 18.

A pair of loops 48 is each attached to the front side 22 of the plate 20. Each of the loops 48 is positioned on an associated one of the bends 36 and each of the loops 48 is positioned proximate the bottom side 30. A first strap 50 is extendable through each of the loops 48 and the first strap 50 may be wrapped around the stanchion 14 such that the first strap 50 retains the first mount 12 on the stanchion 14. A second strap 52 is provided and the second strap 52 is wrapped around the plate 20 and the stanchion 14. The second strap 52 is positioned adjacent to the top side 28 of the plate 20.

A second mount 54 is provided and the second mount 54 may be removably coupled to a horizontal support 56. The horizontal support 56 may be a plank coupled to a wall or the like. The second mount 54 may have the winch 16 removably attached thereto such that the winch 16 is secured on the horizontal support 56. The second mount 54 comprises a bracket 58 that has a first portion 60 forming a right angle with respect to a second portion 62 such that the bracket 58 has an L-shape. The first portion 60 has a first surface 64 and a second surface 66 and the second portion 62 has a first surface 68. The first portion 60 has a plurality of openings 70 extending through the first surface 64 and the second surface 66 of the first portion 60. The first surfaces 64,68 of each of the first portion 60 and the second portion 62 may be positioned to abut an associated one of a forward side 72 and a lower side 74 of the horizontal support 56.

A plurality of fasteners 76 is provided and each of the fasteners 76 may extend through one of the openings 70 to engage the horizontal support 56. Thus, the fasteners 76 retain the second mount 54 on the horizontal support 56. The fasteners 76 may be nails or the like.

A member 78 is provided that has a first end 80, a second end 82 and a peripheral wall 84 extending between the first end 80 and the second end 82. The peripheral wall 84 has a top side 86 and a bottom side 88 and the member 78 is elongated between the first end 80 and the second end 82.

Each of the first end 80 and the second end 82 angles between the top side 86 and the bottom side 88. The first end 80 is attached to the second surface 66 of the first portion 60 such that the member 78 extends forwardly and upwardly from the bracket 58. The top side 86 may have with winch 16 attached thereto such that the winch 16 is positioned adjacent to the second end 82.

A third mount 90 is provided that may be removably coupled to a vertical support 92. The third mount 90 may have the winch 16 removably attached thereto such that the winch 16 is secured to the vertical support 92. The vertical support 92 may be a wall stud or the like. The third mount 90 comprises a brace 94 that has a first end 96, a second end 98 and a perimeter wall 100 extending between the first end 96 and the second end 98 of the brace 94. The perimeter wall 100 has a first side 102, a second side 104 and a third side 106. Each of the first end 96 and the second end 98 of the brace 94 angles between the first side 102 and the second side 104.

A guide 108 is attached to and extends away from the brace 94. The guide 108 is positioned on the first side 102 of the brace 94 such that the guide 108 extends substantially along an intersection of the first side 102 and the third side 106. The guide 108 has an inner surface 110 and an outer surface 112 and the guide 108 has a plurality of apertures 114 each extending through the inner surface 108 and the outer surface 110. Each of the first side 102 of the brace 94 and the inner surface 108 of the guide 108 may be positioned abut an associated one of a forward surface 116 and a lateral surface 118 of the vertical support 92 and the second side 104 may have the winch 16 attached thereto. A plurality of the fasteners 76 may each extend through apertures 114 and engage the vertical support 92 wherein the third mount 90 is retained on the vertical support 92. The winch 16 may be coupled to each of the first mount 12, the second mount 54 and the third mount 90 using nuts and bolts or the like.

In use, the first mount 12, the second mount 54 or the third mount 90 are selected for use based on available support. The first mount 12 is selected when the game 18 is to be hoisted outside or when only the stanchion 14 is available for support. The second mount 54 is selected when the horizontal support 56 is available and the third mount 90 is selected when the vertical support 92 is available. The winch 16 is coupled to the selected one of the first mount 12, the second mount 54 or the third mount 90 after the selected first mount 12, second mount 54 or third mount 90 is attached to the associated stanchion 14, the horizontal support 56 or the vertical support 92. Additionally, the selected first mount 12, second mount 54 or third mount 90 are positioned a distance away from ground sufficient to allow the winch 16 to hoist the game 18 upwardly from ground. The selected first mount 12, second mount 54 or third mount 90 facilitates the game 18 to be hoisted by a single individual when assistance for the single individual is not available.

With respect to the above description then, it is to be realized that the optimum dimensional relationships for the parts of an embodiment enabled by the disclosure, to include variations in size, materials, shape, form, function and manner of operation, kit and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A winch mounting kit configured to mount a winch to a selectable one of a plurality of support surfaces, said kit comprising:

a first mount being configured to be removably coupled to a stanchion, said first mount being configured to have a winch being removably attached thereto such that the winch is secured on the stanchion;

a second mount being configured to be removably coupled to a horizontal support, said second mount being configured to have the winch being removably attached thereto such that the winch is secured on the horizontal support; and a third mount being configured to be removably coupled to a vertical support, said third mount being configured to have the winch being removably attached thereto such that said winch is secured to the vertical support, wherein said third mount comprises a brace having a first end, a second end and a perimeter wall extending between said first end and said second end of said brace, said perimeter wall having an first side, a second side and a third side, each of said first end and said second end of said brace angling between said first side and said second side, a guide being attached to and extending away from said brace, said guide being positioned on said first side such that said guide extends substantially along an intersection of said first side and said third side, wherein said guide has an inner surface and an outer surface, said guide having a plurality of apertures each extending through said inner surface and said outer surface, each of said first side and said inner surface being configured to abut an associated one of a forward surface and a lateral surface of the vertical support, said second side being configured to have the winch attached thereto.

2. The kit according to claim 1, wherein said first mount comprises a plate having a front side, a back side and a peripheral edge extending between said front side and said back side, said peripheral edge having a top side, a bottom side, a first lateral side and a second lateral side.

3. The kit according to claim 2, wherein said plate has a pair of bends thereon, each of said bends being positioned adjacent to and being coextensive with an associated one of said first lateral side and said second lateral side such that each of said first lateral side and said second lateral side are directed rearwardly from said back side, said plate being configured to be positioned on the stanchion having each of said first lateral side and said second lateral side abutting the stanchion.

4. The kit according to claim 2, further comprising a support having a top surface, a bottom surface and a rear edge, said rear edge being coupled to said front side of said plate, said support being positioned at an angle such that said support extends substantially between an intersection of said first lateral side and said bottom side and an intersection of said second lateral side and said top side, said top surface being configured to have the winch coupled thereto.

5. The kit according to claim 4, further comprising a gusset being coupled between said bottom surface of said support and said front side of said plate wherein said gusset is configured to support a weight of the winch.

6. The kit according to claim 2, further comprising:
said first mount having a pair of bends; and
a pair of loops, each of said loops being attached to said front side, each of said loops being positioned on an associated one of said bends, each of said loops being positioned proximate said bottom side.

7. The kit according to claim 6, wherein a first strap being extendable through each of said loops, said first strap being configured to be wrapped around the stanchion such that said first strap retains said first mount on the stanchion.

8. The kit according to claim 1, wherein said second mount comprises a bracket having a first portion forming a right angle with respect to a second portion such that said bracket has an L-shape, said first portion having a first surface and a second surface, said second portion having a first surface, said first portion having a plurality of openings extending through said first surface and said second surface, said first surface of each of said first portion and said second portion being configured to abut an associated one of a forward side and a lower side of the horizontal support.

9. The kit according to claim 8, wherein a plurality of fasteners, each of said fasteners being configured to extend through one of said openings to engage the horizontal support such that said second mount is retained on the horizontal support.

10. The kit according to claim 1, wherein said second mount further comprises a member having a first end, a second end and a peripheral wall extending between said first end and said second end, said peripheral wall having a top side and a bottom side, said member being elongated between said first end and said second end, each of said first end and said second end angling between said top side and said bottom side.

11. The kit according to claim 10, further comprising:
a bracket having a first portion, said first portion having a second surface; and
said first end of said member being attached to said second surface of said first portion such that said member extends forwardly and upwardly from said bracket, said top side being configured to have with winch attached thereto such that the winch is positioned adjacent to said second end.

12. The kit according to claim 1, wherein a plurality of fasteners, each of said fasteners being configured to extend through apertures and engage the vertical support wherein said third mount is retained on the vertical support.

13. A winch mounting kit configured to mount a winch to a selectable one of a plurality of support surfaces, said kit comprising:
a first mount being configured to be removably coupled to a stanchion, said first mount being configured to have a winch being removably attached thereto such that the winch is secured on the stanchion, said first mount comprising:
a plate having a front side, a back side and a peripheral edge extending between said front side and said back side, said peripheral edge having a top side, a bottom side, a first lateral side and a second lateral side, said plate having a pair of bends thereon, each of said bends being positioned adjacent to and being coextensive with an associated one of said first lateral side and said second lateral side such that each of said first lateral side and said second lateral side are directed rearwardly from said back side, said plate being configured to be positioned on the stanchion having each of said first lateral side and said second lateral side abutting the stanchion,
a support having a top surface, a bottom surface and a rear edge, said rear edge being coupled to said front side of said plate, said support being positioned at an angle such that said support extends substantially between an intersection of said first lateral side and said bottom side and an intersection of said second lateral side and said top side, said top surface being configured to have the winch coupled thereto,
a gusset being coupled between said bottom surface of said support and said front side of said plate wherein said gusset is configured to support a weight of the winch,
a pair of loops, each of said loops being attached to said front side, each of said loops being positioned on an associated one of said bends, each of said loops being positioned proximate said bottom side, and
a first strap being extendable through each of said loops, said first strap being configured to be wrapped around the stanchion such that said first strap retains said first mount on the stanchion;
a second mount being configured to be removably coupled to a horizontal support, said second mount being configured to have the winch being removably attached thereto such that the winch is secured on the horizontal support, said second mount comprising:
a bracket having a first portion forming a right angle with respect to a second portion such that said bracket has an L-shape, said first portion having a first surface and a second surface, said second portion having a first surface, said first portion having a plurality of openings extending through said first surface and said second surface, said first surface of each of said first portion and said second portion being configured to abut an associated one of a forward side and a lower side of the horizontal support,
a plurality of fasteners, each of said fasteners being configured to extend through one of said openings to engage the horizontal support such that said second mount is retained on the horizontal support, and
a member having a first end, a second end and a peripheral wall extending between said first end and said second end, said peripheral wall having a top side and a bottom side, said member being elongated between said first end and said second end, each of said first end and said second end angling between said top side and said bottom side, said first end being attached to said second surface of said first portion such that said member extends forwardly and upwardly from said bracket, said top side being configured to have with winch attached thereto such that the winch is positioned adjacent to said second end; and
a third mount being configured to be removably coupled to a vertical support, said third mount being configured to have the winch being removably attached thereto such that said winch is secured to the vertical support, said third mount comprising:
a brace having a first end, a second end and a perimeter wall extending between said first end and said second end of said brace, said perimeter wall having an first side, a second side and a third side, each of said first end and said second end of said brace angling between said first side and said second side, and a guide being attached to and extending away from said brace, said guide being positioned on said first side such that said guide extends substantially along an intersection of said first side and said third side, said guide having an inner surface and an outer surface, said guide having a plurality of apertures each extending through said inner surface and said outer surface, each of said first side and said inner surface being configured to abut an associated one of a forward surface and a lateral surface of the vertical support, said second side being configured to have the winch attached thereto, and a plurality of fasteners, each of said fasteners being configured to extend through apertures and engage the vertical support wherein said third mount is retained on the vertical support.

* * * * *